US011955252B2

(12) United States Patent
Huang et al.

(10) Patent No.: US 11,955,252 B2
(45) Date of Patent: Apr. 9, 2024

(54) CABLE

(71) Applicant: Hitachi Metals, Ltd., Tokyo (JP)

(72) Inventors: Detian Huang, Tokyo (JP); Masanori Kobayashi, Tokyo (JP); Masashi Moriyama, Tokyo (JP); Kazuhiro Aida, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/903,539

(22) Filed: Sep. 6, 2022

(65) Prior Publication Data

US 2023/0099225 A1 Mar. 30, 2023

(30) Foreign Application Priority Data

Oct. 26, 2021 (JP) ................................ 2021-174397

(51) Int. Cl.
*H01B 11/04* (2006.01)
*H01B 1/02* (2006.01)
*H01B 7/18* (2006.01)

(52) U.S. Cl.
CPC ............. *H01B 1/026* (2013.01); *H01B 1/023* (2013.01); *H01B 7/18* (2013.01)

(58) Field of Classification Search
CPC .......... H01B 7/04; H01B 7/0045; H01B 7/17; H01B 9/003; H01B 11/04; H01B 11/06
USPC ................................................ 174/36, 113 R
See application file for complete search history.

(56) References Cited

U.S. PATENT DOCUMENTS 2,924,141 A * 2/1960 Kinniburgh ............ H01B 9/024 87/9
5,414,211 A * 5/1995 Chan .................. H01B 11/1033 174/109
7,674,973 B2 * 3/2010 Cardas .................. H01B 11/12 174/102 R
2019/0164667 A1 * 5/2019 Huang ............... H01B 11/1033

FOREIGN PATENT DOCUMENTS

JP 2002-313144 A 10/2002
JP 2020-087681 * 6/2020
WO WO 93/16478 * 8/1993

* cited by examiner

*Primary Examiner* — Chau N Nguyen
(74) *Attorney, Agent, or Firm* — MCGINN I.P. LAW GROUP, PLLC.

(57) ABSTRACT

A cable is composed of a cable core including one or more electric wires, a shield layer covering around the cable core, and a sheath covering around the shield layer. The shield layer includes a braided shield braided in such a manner that first metal wires composed of aluminum or an aluminum alloy intersect with second metal wires composed of copper or a copper alloy. An outer diameter of each of the second metal wires is larger than an outer diameter of each of the first metal wires.

5 Claims, 2 Drawing Sheets

CABLE

CROSS-REFERENCE TO RELATED APPLICATION

The present patent application claims the priority of Japanese patent application No. 2021-174397 filed on Oct. 26, 2021, and the entire contents thereof are hereby incorporated by reference.

TECHNICAL FIELD

The present invention relates to a cable.

BACKGROUND ART

Conventionally, as a cable configured to be connected to a servomotor or the like, for example, a composite cable including a plurality of signal lines composed of twisted pair wires and a plurality of power supply lines arranged around the signal lines has been proposed (See Patent Literature 1). This cable is provided with a shield layer composed of a braided shield in which metal wires composed of a tin-plated annealed copper wire are braided to collectively cover around the plurality of signal lines and the plurality of power supply lines.

CITATION LIST

Patent Literature

Patent Literature 1: JP2002-313144A

SUMMARY OF THE INVENTION

In recent years, the movement toward decarbonization has been accelerating, and the worldwide demand for copper as a decarbonization resource is increasing, so the price of copper is skyrocketing. For example, the price of copper is more than four times that of aluminum. Therefore, reducing the amount of copper used in a conductor and a shield layer in electric wires and cables has been desired while considering the influence on conductor resistance and shield characteristics. Notably, in cables, the outer diameter of the cable tends to increase as the number of electric wires increases. As the outer diameter of the cable increases, the amount of copper used in the metal wires constituting the shield layer also increases, which may significantly increase the cost.

Further, in the cable, when the shield layer is composed of metal wires composed of copper or a copper alloy, the weight of the cable tends to increase as the amount of the metal wires to be used increases. When a proportion of the weight of the shield layer to the weight of the entire cable becomes large, a large load is applied to the shield layer, for example, when the cable is bent, an external force on the cable or the own weight of the cable is applied to the shield layer. Therefore, the metal wires constituting the shield layer may be disconnected due to the external force or the own weight of the cable.

Therefore, an object of the present invention is to provide a cable that can reduce the amount of copper to be used and that is less likely to cause the disconnection in the shield layer due to the external force or the own weight of the cable.

To solve the aforementioned problems, one aspect of the present invention provides a cable comprising:

a cable core including one or more electric wires;

a shield layer covering around the cable core; and a sheath covering around the shield layer, wherein the shield layer comprises a braided shield braided in such a manner that first metal wires composed of aluminum or an aluminum alloy intersect with second metal wires composed of copper or a copper alloy, and wherein an outer diameter of each of the second metal wires is larger than an outer diameter of each of the first metal wires.

Effects of the Invention

According to the present invention, it is possible to provide a cable that can reduce the amount of copper to be used, and that is less likely to cause the disconnection in the shield layer due to the external force or the own weight of the cable.

BEST MODE FOR CARRYING OUT THE INVENTION

[Embodiments]

Embodiments of the present invention will be described below in conjunction with the accompanying drawings.

Figure 1A:
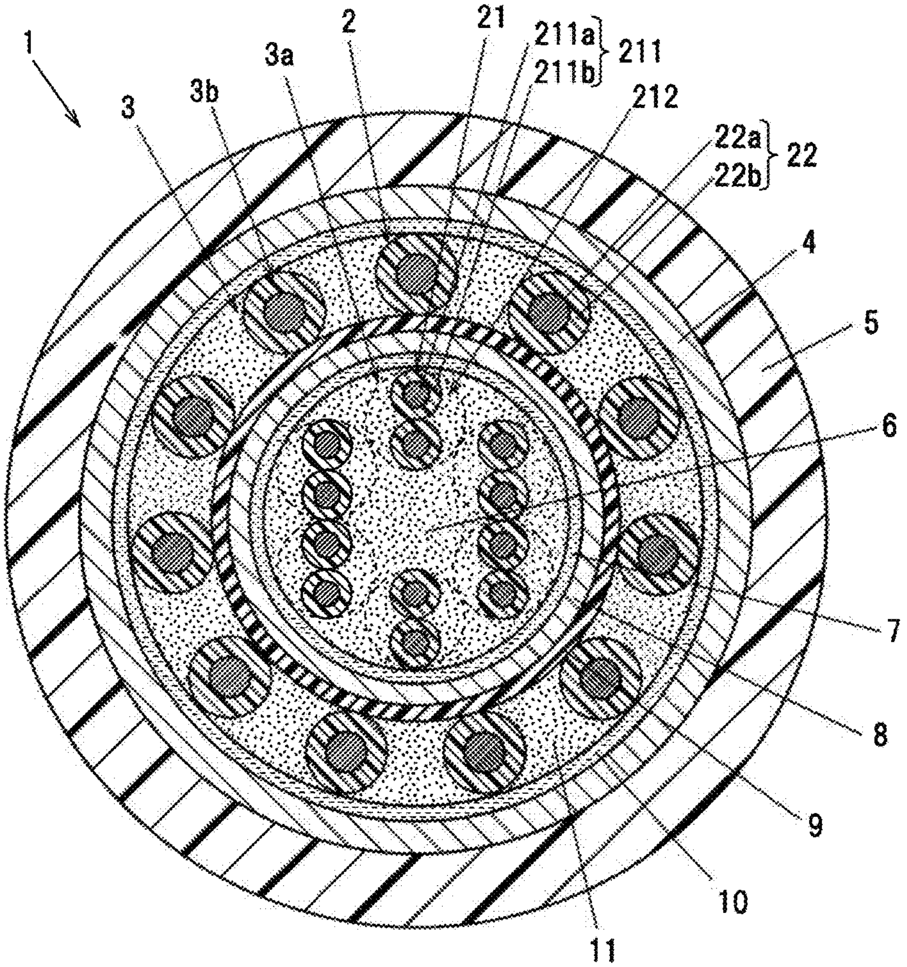
FIG. 1A is a cross-sectional view showing a cross-section perpendicular to a longitudinal direction showing a cable (electric wires) according to an embodiment of the present invention.
Figure 1B:
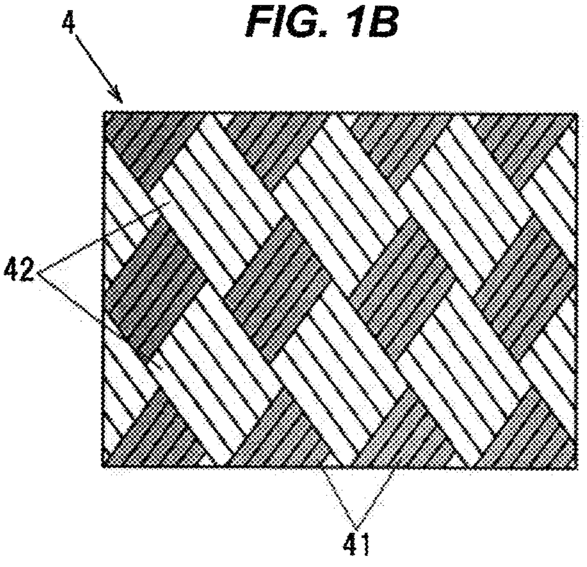
FIG. 1B is a schematic diagram of a shield layer.
Figure 1C:
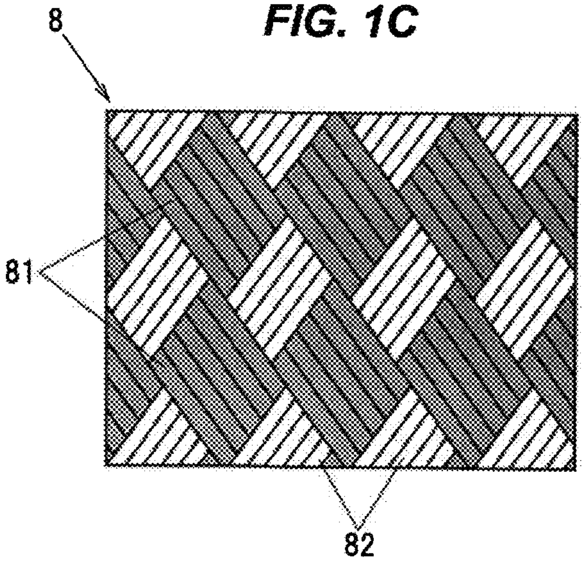
FIG. 1C is a schematic diagram of an inner shield layer.

FIG. 1A is a cross-sectional view showing a cross-section perpendicular to the longitudinal direction of a cable 1 (one or more electric wires 2) according to the present embodiment. Further, FIG. 1B is a schematic diagram of a shield layer (hereinafter, also referred to as an outer shield layer) 4 and FIG. 1C is a schematic diagram of an inner shield layer 8. The cable 1 is used, for example, as a fixed portion cable or the like for connecting an industrial robot and a control device or the like in a factory or the like. The cable 1 may be used as a cable for a fixed portion or the like of factory equipment other than an industrial robot or may be used as a cable or the like to be wired inside an automobile or the like.

As shown in FIG. 1A, the cable 1 includes a cable core 3 including one or more electric wires 2, a shield layer 4 (hereinafter, also referred to as an outer shield layer 4) that covers around the cable core 3, and a sheath 5 that covers around the shield layer 4.

(Electric Wire 2)

The one or more electric wires 2 include a plurality of signal lines 21 for signal transmission and a plurality of power supply lines 22 for power supply. That is, the cable 1 is a composite cable in which the signal lines 21 and the power supply lines 22 are combined.

The signal line 21 is composed of a twisted pair wire 212 formed by twisting a pair of insulated wires 211. Each insulated wire 211 constituting the twisted pair wire 212 includes a conductor 211*a* formed by twisting a plurality of strands (i.e., elementary wires and, e.g., each strand having an outer diameter of 0.1 mm or less) composed of a tin-plated annealed copper wire or the like, and an insulator 211*b* provided to cover around the conductor 211*a*. The insulator 211*b* is composed of, e.g., fluorine resin (i.e., fluoropolymer) such as ETFE (tetrafluoroethylene-ethylene copolymer), FEP (tetrafluoroethylene-hexafluoropropylene copolymer), PFA (tetrafluoroethylene/perfluoroalkyl vinyl ether copolymer).

Here, the case where six (six pairs) signal lines 21 (twisted pair wires 212) are used is shown, but the number of signal lines 21 (twisted pair wires 212) is not limited to thereto. The number of signal lines 21 may be one or more than six. It is more desirable that each twisted pair wire 212 is twisted at a different twist pitch to suppress crosstalk (noise) between the twisted pair wires 212. Further, the signal line 21 is not limited to the twisted pair wire 212. For example, the signal line 21 may be a coaxial cable.

The power supply line 22 includes a conductor 22*a* formed by twisting a plurality of strands (i.e., elementary wires and, e.g., each strand having an outer diameter of 0.1 mm or less) composed of a tin-plated annealed copper wire or the like, and an insulator 22*b* provided to cover around the conductor 22*a*. The insulator 211*b* is composed of, e.g., fluorine resin (i.e., fluoropolymer) such as ETFE (tetrafluoroethylene-ethylene copolymer), FEP (tetrafluoroethylene-hexafluoropropylene copolymer), PFA (tetrafluoroethylene/perfluoroalkyl vinyl ether copolymer). The power supply line 22 has a larger conductor cross-sectional area and a larger outer diameter than those of the insulated wire 211 constituting the twisted pair wire 212. Here, the case where eleven (11) power supply lines 22 are used is shown, but the number of power supply lines 22 is not limited thereto. The number of power supply lines 22 may be one or more than eleven.

(Cable Core 3)

The cable core 3 includes an inner shield layer 8 covering around the one or more electric wires 2 and being provided inside the shield layer 4. For example, in the cable 1 shown in FIG. 1A, the cable core 3 includes an inner layer core 3*a* including the plurality of signal lines 21, an inner shield layer 8 provided to cover around the inner layer core 3*a*, and an outer layer core 3*b* including the plurality of power supply lines 22 twisted around the inner shield layer 8. The cable 1 shown in FIG. 1A has a configuration in which the one or more electric wires 2 are provided around the inner shield layer 8, but the configuration of the cable 1 is not limited thereto. The cable core 3 does not need to be provided with the one or more electric wires 2 between the inner shield layer 8 and the shield layer 4. As a result, the outer diameter of the cable 1 can be reduced, so that the amount of the metal wires composed of copper or a copper alloy constituting the shield layer provided on the outside of the cable core can be reduced. As a result, the cost of the cable 1 can be reduced.

The inner layer core 3*a* is configured by twisting six (six pairs) of signal lines 21 (twisted pair wires 212). Since stress is concentrated at a cable center during bending, in the present embodiment, the signal lines 21 (twisted pair wires 212) are spirally twisted around a filler 6 to form the inner layer core 3*a*. This makes it possible to suppress the stress at the time of bending from concentrating on the signal lines 21 (twisted pair wires 212) and deteriorating the transmission characteristics of the signal lines 21 (twisted pair wires 212).

As the filler 6, e.g., a filamentous (i.e., thread-like) body such as rayon (staple fiber) thread can be used. The rayon thread has an appropriate cushioning property and does not break even when being bent, so that it is particularly suitable when the cable 1 is used for the bending purpose. The filamentous body used for the filler 6 is not limited to the rayon thread; for example, string, paper, jute, non-woven fabric, or the like can also be used. Further, the filler 6 is not limited to the filamentous body; for example, a strip-shaped one can be used. By imparting the cushioning property, the filler 6 also disperses the stress applied to the signal lines 21 (twisted pair wires 212) at the time of bending, thereby suppressing deterioration of the transmission characteristics of the signal lines 21 (twisted pair wires 212).

A twisting direction of the twisted pair wire 212 may be opposite to a twisting direction of the conductor 211*a* and a twisting direction of the inner layer core 3*a*. The twisting direction of the conductor 211*a* is the same as the twisting direction of the inner layer core 3*a*. This is because if the twisting direction of the twisted pair wire 212 is the same as the twisting direction of the conductor 211*a* and the inner layer core 3*a*, the strands constituting the conductor 211*a* will be repeatedly twisted in the same direction. Therefore, the wire may be cut off when being bent. By setting the twisting direction of the twisted pair wire 212 in the direction opposite to the twisting direction of the conductor 211*a* and the inner layer core 3*a*, it is possible to suppress the disconnection of the strands and improve the resistance to bending.

The twisting direction of the conductor 211*a* is the direction in which, when viewed from one end side of the insulated wire 211, the strands rotate from the other end side to the one end side. The twisting direction of the twisted pair wire 212 is the direction in which, when viewed from one end side of the inner layer core 3*a*, the insulated wire 211 rotates from the other end side to the one end side. Further, the twisting direction of the inner layer core 3*a* is a direction in which, when viewed from the one end side of the inner layer core 3*a*, the twisted pair wire 212 rotates from the other end side to the one end side.

A first binder tape 7 is spirally wound around the inner layer core 3*a*. As the first binder tape 7, paper tape, a tape composed of a non-woven fabric, or the like can be used. The first binder tape 7 is wound to have a substantially circular shape in a cross-sectional view. Each of the signal lines 21 (twisted pair wires 212) constituting the inner layer core 3*a* is in contact with an inner peripheral surface of the first binder tape 7. The inner shield layer 8 is provided around the first binder tape 7. Details of the inner shield layer 8 will be described later.

A resin tape 9 is spirally wound around the inner shield layer 8. The resin tape 9 improves slippage between the power supply lines 22 constituting the outer layer core 3*b* and the inner shield layer 8 and suppressing wear. As the resin tape 9, it is preferable to use a material that is resistant to wear and has good slipperiness. For example, nylon or a fluorine resin (fluoropolymer) such as PTFE (polytetrafluoroethylene) or ETFE (tetrafluoroethylene- ethylene copolymer) can be used. The resin tape 9 may not be provided depending on the application to which the cable 1 is applied, the wiring location, and the like.

Eleven power supply lines 22 are spirally twisted around the resin tape 9 to form the outer layer core 3*b*. In the present embodiment, a filler 11 is twisted together with the power supply lines 22 to form the outer layer core 3*b*. The filler 11 is provided to shape the external shape of the cable 1 to have a circular shape. Further, the filler 11 is interposed between the power supply lines 22 constituting the outer layer core 3*b* to suppress the power supply lines 22 from being worn at the time of bending or the like. In the present embodiment, in the outer layer core 3*b*, the adjacent power supply lines 22 are not in contact with each other. As the filler 11 to be used for the outer layer core 3*b*, rayon, or the like can be used as in the filler 6 to be used for the inner layer core 3*a*. As described above, the cable core 3 does not need to be provided with the outer layer core 3*b* depending on the application to which the cable 1 is applied, the wiring location, and the like. At this time, the cable 1 has a configuration in which, for example, the cable core 3 is composed of the resin tape 9 and a second binder tape 10 described later provided around the inner shield layer 8 as needed, and the shield layer 4 is provided on the outer side of the cable core 3.

The second binder tape 10 composed of paper tape or non-woven fabric is spirally wound around the outer layer core 3*b*. The second binder tape 10 is wound to have a substantially circular shape in a cross-sectional view by appropriately adjusting the amount and arrangement of the filler 11. Each of all the power supply lines 22 constituting the outer layer core 3*b* is in contact with an inner peripheral surface of the second binder tape 10 and an outer peripheral surface of the resin tape 9. The second binder tape 10 may not be provided depending on the application to which the cable 1 is applied, the wiring location, and the like.

(Sheath 5)

The outer shield layer 4 is provided around the second binder tape 10, and the sheath 5 composed of an insulator is provided to cover around the outer shield layer 4. As the sheath 5, e.g., a resin composition composed of polyvinyl chloride (PVC) resin, a polyurethane (PU) resin, or the like as a base resin can be used so that the cable 1 can be protected from an external force.

(Outer Shield Layer 4)

As shown in FIG. 1B, in the cable 1 according to the present embodiment, the outer shield layer 4 is formed by a plurality of first metal wires 41 composed of aluminum or an aluminum alloy and a plurality of second metal wires 42 composed of copper or a copper alloy. The outer shield layer 4 is composed of a braided shield braided in such a manner that the first metal wires 41 and the second metal wires 42 intersect with each other.

This makes it possible to reduce the amount of copper to be used, and the outer shield layer 4 can be made lighter than a braided shield composed only of metal wires composed of copper or a copper alloy. Thus, the total weight of the cable 1 can be reduced. Further, since the outer shield layer 4 includes the second metal wires 42 composed of aluminum or an aluminum alloy having a low yield strength, the outer shield layer 4 becomes soft and the cable 1 becomes easy to bend. Further, the outer shield layer 4 is less likely to have a disconnection of the metal wires due to rubbing between the metal wires when the cable 1 is bent, compared with a braided shield composed of only the metal wires composed of aluminum or an aluminum alloy. This is because the metal wires in the braided shield formed by braiding the first metal wires 41 composed of aluminum or an aluminum alloy and the second metal wires 42 composed of copper or a copper alloy are more slippery to each other, and the wear is less likely to occur than the metal wires in the braided shield formed by braiding the metal wires composed of aluminum or an aluminum alloy when the metal wires rub against each other.

Further, when connecting a terminal of the cable 1 to a substrate or the like, it is difficult to connect the braided shield consisting of metal wires composed of aluminum or an aluminum alloy by soldering. On the other hand, in the present embodiment, since the outer shield layer 4 includes the second metal wires 42 composed of copper or a copper alloy, it is possible to perform the connection by soldering easily.

Further, when processing the terminal of the cable 1, in some cases, the outer shield layer 4 is exposed at the terminal of the cable 1, the exposed outer shield layer 4 (braided shield) is loosened by using a special tool or the like, the loosened and separated metal wires 41 and 42 are bundled to branch from the cable core 3, and connected to a substrate or the like. In this case, the outer shield layer 4 is connected to the substrate or the like by connecting the bundled metal wires 41 and 42 by crimping or soldering. In the present embodiment, since the outer shield layer 4 includes the first metal wires 41 composed of low-proof stress aluminum or an aluminum alloy, loosening the outer shield layer 4 is easier than the braided shield consisting of copper. Further, when the loosened metal wires 41, 42 are bundled, the first metal wire 41 achieves the function of maintaining the shape, so that the metal wires 41, 42 are easily bundled into a desired shape. When bundling the metal wires 41, 42, the second metal wire 42 is spirally wound around the first metal wire 41 so that the connection by soldering can be easily performed.

In the present embodiment, for example, an aluminum wire composed of pure aluminum can be used as the first metal wire 41 composed of aluminum. Further, as the first metal wire 41 composed of an aluminum alloy, e.g., an aluminum alloy wire composed of an Al—Zr alloy, an Al—Ni—Zr alloy, an Al—Co—Zr alloy, an Al—Fe—Zr alloy or the like can be used. Further, as the second metal wires 42 composed of copper, a tin-plated annealed copper wire having a tin-plating on a surface of an annealed copper wire can be used. As the second metal wire 42 composed of a copper alloy, e.g., a copper alloy wire composed of a copper alloy containing one or more metal elements from the group consisting of e.g., magnesium, tin, indium, silver, nickel, and zinc in a predetermined content, and the balance being copper and unavoidable impurities can be used. For the above-mentioned annealed copper wire, tough pitch copper, oxygen-free copper, or the like can be used. Further, in the present embodiment, to further suppress the disconnection due to rubbing between the metal wires, liquid paraffin is preferably applied to the surface of the second metal wire 42 (for example, the surface of the tin-plated annealed copper wire) as lubricating oil.

In the cable 1 according to the present embodiment, an outer diameter of the second metal wire 42 is larger than an outer diameter of the first metal wire 41. The outer shield layer 4 receives a large load when an external force is applied to the cable 1 or when the cable 1 is bent. In particular, in the cable 1 having a large number of electric wires 2 and a large diameter (with the outer diameter of 10 mm or more), a load is applied to the outer shield layer 4 due to the weight (self-weight) of the cable 1, so that the metal wires constituting the outer shield layer 4 may be subjected to the disconnection. As in the present embodiment, the outer diameter of the second metal wire 42 composed of copper or a copper alloy is larger than the outer diameter of the first metal wire 41 composed of aluminum or an aluminum alloy to obtain higher strength. The second metal wires 42 with the high strength can be subjected to the load by an external force or its own weight, so that it is possible to suppress the occurrence of disconnection in the first metal wires 41 with the low strength.

Further, the first metal wire 41 composed of aluminum or an aluminum alloy is vulnerable to external damage (i.e., trauma), and when it is scratched, it is liable to be broken by damage starting from scratch. The sheath 5 is formed by extrusion molding, and if the first metal wire 41 is scratched due to interference with surrounding members or the like during the line drawing (line traveling), when the sheath 5 is formed, the first metal wire 41 is likely to be broken from scratch. On the other hand, as in the present embodiment, the outer diameter of the second metal wire 42 composed of copper or a copper alloy is made larger than the outer diameter of the first metal wire 41 composed of aluminum or an aluminum alloy. Therefore, the first metal wire 41 is arranged at a position more profound than the second metal wire 42. In the outer shield layer 4, in the cross-section of cable 1 shown in FIG. 1A, an outer surface (i.e., a surface facing an inner surface of the sheath 5) of the second metal wires 42 composed of copper or a copper alloy tends to protrude radially outwardly from an outer surface (i.e., a surface facing the inner surface of the sheath 5) of the first metal wire 41 composed of aluminum or an aluminum alloy. As a result, the first metal wire 41 is less likely to be scratched when the sheath 5 is formed, and the first metal wire 41 is less likely to be broken by the damage starting from the scratch. Further, if a large load is applied to the outer shield layer 4 when an external force is applied to the cable 1 or when the cable 1 is bent, the first metal wire 41 may be scratched by contact between the sheath 5 and the outer shield layer 4. It is possible to suppress the occurrence of scratches on the first metal wire 41 and the occurrence of disconnection in the outer shield layer 4 starting from scratch.

Further, by making the outer diameter of the second metal wire 42 composed of copper or a copper alloy larger than the outer diameter of the first metal wire 41 composed of aluminum or an aluminum alloy, a proportion of copper or a copper alloy in the outer shield layer 4 increases and electrical conductivity increases, thereby the resistance to external noise also increases. A braid density of the outer shield layer 4 should be 85% or more to increase the resistance to external noise further. In the present embodiment, the outer diameter of the first metal wire 41 composed of aluminum or an aluminum alloy is 0.16 mm, and the outer diameter of the second metal wire 42 composed of copper or a copper alloy is 0.18 mm The outer diameter of the first metal wires 41 composed of aluminum or an aluminum alloy is, e.g., 0.05 mm or more and 0.40 mm or less. The outer diameter of the second metal wire 42 composed of copper or a copper alloy is, e.g., 0.05 mm or more and 0.40 mm or less. In the first metal wire 41 and the second metal wire 42 having such an outer diameter, each of the outer diameter of the first metal wire 41 and the second metal wire 42 is selected to satisfy a relationship "Outer diameter of the first metal wire 41<Outer diameter of the second metal wire 42". In particular, when the outer diameter of the second metal wire 42 is 1.0 times or more and 1.2 times or less than the outer diameter of the first metal wire 41, the above-mentioned effect can be easily obtained.

(Inner Shield Layer 8)

As shown in FIG. 1C, the inner shield layer 8 is composed of a braided shield braided in such a manner that a plurality of third metal wires 81 composed of aluminum or an aluminum alloy and a plurality of fourth metal wires 82 composed of copper or a copper alloy intersect with each other, similarly to the outer shield layer 4 described above. As a result, the amount of copper to be used can be further reduced, a more flexible cable 1 with lighter weight can be realized, and the inner shield layer 8 can be easily connected by soldering.

However, in the inner shield layer 8, unlike the outer shield layer 4 described above, an outer diameter of the third metal wire 81 composed of aluminum or an aluminum alloy is preferably larger than an outer diameter of the fourth metal wire 82 composed of copper or a copper alloy. As a result, the third metal wire 81 composed of aluminum or an aluminum alloy, which is relatively easily deformed, acts to fill a gap between the metal wires 81 and 82, and it becomes possible to improve the resistance to external noise further. To further increase the resistance to external noise, the braid density of the inner shield layer 8 is preferably at least 85% or more, and is preferably higher than the braid density of the outer shield layer 4.

In the present embodiment, in the inner shield layer 8, the outer diameter of the third metal wire 81 composed of aluminum or an aluminum alloy is 0.16 mm, and the outer diameter of the fourth metal wire 82 composed of copper or a copper alloy is 0.12 mm. As described above, in the present embodiment, in the outer shield layer 4, the outer diameter of the first metal wire 41 composed of aluminum or an aluminum alloy is 0.16 mm, and the first metal wires composed of aluminum or an aluminum alloy is 0.16 mm. The outer diameter of the first metal wire 41 is equal to the outer diameter of the third metal wire 81. As a result, a common aluminum wire or aluminum alloy wire can be used as the first metal wire 41 and the third metal wire 81, and the cost can be reduced.

With the common use of the first metal wire 41 and the third metal wire 81, the outer diameter of the second metal wire 42 can be larger than the outer diameter of the fourth metal wire 82. Further, the outer diameters of the first metal wire 41 and the third metal wire 81 are larger than the outer diameter of the fourth metal wire 82 and smaller than the outer diameter of the second metal wire 42. As a result, the following two formulas are satisfied:

(Outer diameter of the first metal wire 41)<(Outer diameter of the second metal wire 42), and (Outer diameter of the third metal wire 81)>(Outer diameter of the fourth metal wire 82).

It is thus possible to suppress disconnection in the outer shield layer 4 and improve resistance to external noise in the inner shield layer 8, and it is possible to reduce the cost because of the common use of the first metal wire 41 and the third metal wire 81.

The outer diameter of the third metal wires 81 composed of aluminum or an aluminum alloy is, e.g., 0.05 mm or more and 0.40 mm or less. The outer diameter of the fourth metal wire 82 composed of copper or a copper alloy is, e.g., 0.05 mm or more and 0.40 mm or less. In the third metal wire 81 and the fourth metal wire 82 having such an outer diameter, each of the outer diameter of the third metal wire 81 and the fourth metal wire 82 is selected to satisfy a relationship "Outer diameter of the third metal wire 81>Outer diameter of the fourth metal wire 82". In particular, when the outer diameter of the third metal wire 81 is 1.0 times or more and 1.4 times or less than the outer diameter of the fourth metal wire 82, the above-mentioned effect can be easily obtained.

(Functions and Effects of Embodiments)

As described above, in the cable 1 according to the present embodiment, the outer shield layer 4 is composed of a braided shield braided in such a manner that the plurality of first metal wires 41 composed of aluminum or an aluminum alloy and the plurality of second metal wires 42 composed of copper or a copper alloy intersect with each other, and the outer diameter of the second metal wire 42 is larger than the outer diameter of the first metal wire 41. By using the plurality of first metal wires 41 composed of aluminum or an aluminum alloy for the outer shield layer 4, it is possible to reduce the amount of expensive copper to be used and realize a low-cost, lightweight, and easily bendable cable 1. Further, by making the outer diameter of the second metal wire 42 composed of copper or a copper alloy larger than the outer diameter of the first metal wire 41 composed of aluminum or an aluminum alloy, disconnection is less likely to occur in the outer shield layer 4 due to the external force and its own weight. The present invention is particularly effective in a large-diameter cable 1 in which the amount of metal used in the outer shield layer 4 is large, particularly in a cable 1 with an outer diameter of 10 mm or more.

With a conventional composite cable that uses only metal wires composed of copper or a copper alloy for the shield layer, because the cable is difficult to bend and is heavy, there was a problem that it is difficult to route the cable, difficult to handle the cable, and difficult to carry the cable when laying the cable. On the other hand, according to the present embodiment, the amount of copper to be used in the outer shield layer 4 and the inner shield layer 8 can be reduced, and by using aluminum or an aluminum alloy that is light and easily deformed, it is possible to realize a lightweight cable 1 that is easy to be bent and processed into a shape according to the layout location.

(Other Embodiments)

In the above embodiment, the case where the cable core 3 has the inner shield layer 8 has been described, but the present invention is not limited thereto, and the inner shield layer 8 can be omitted. For example, as in a cable 1*a* shown in FIG. 2, the cable core 3 may have a configuration in which a plurality of electric wires 2 are twisted together and a binder tape 10 is spirally wound around the electric wires 2 and the inner shield layer 8 is not provided. The cable 1*a* includes a shield layer 4 that covers around the cable core 3 and a sheath 5 that covers around the shield layer 4. As shown in FIG. 1B, the shield layer 4 is composed of a braided shield braided in such a manner that a plurality of first metal wires 41 composed of aluminum or an aluminum alloy and a plurality of second metal wires 42 composed of copper or a copper alloy intersect with each other, and an outer diameter of the second metal wire 42 is larger than an outer diameter of the first metal wire 41.

Figure 2:
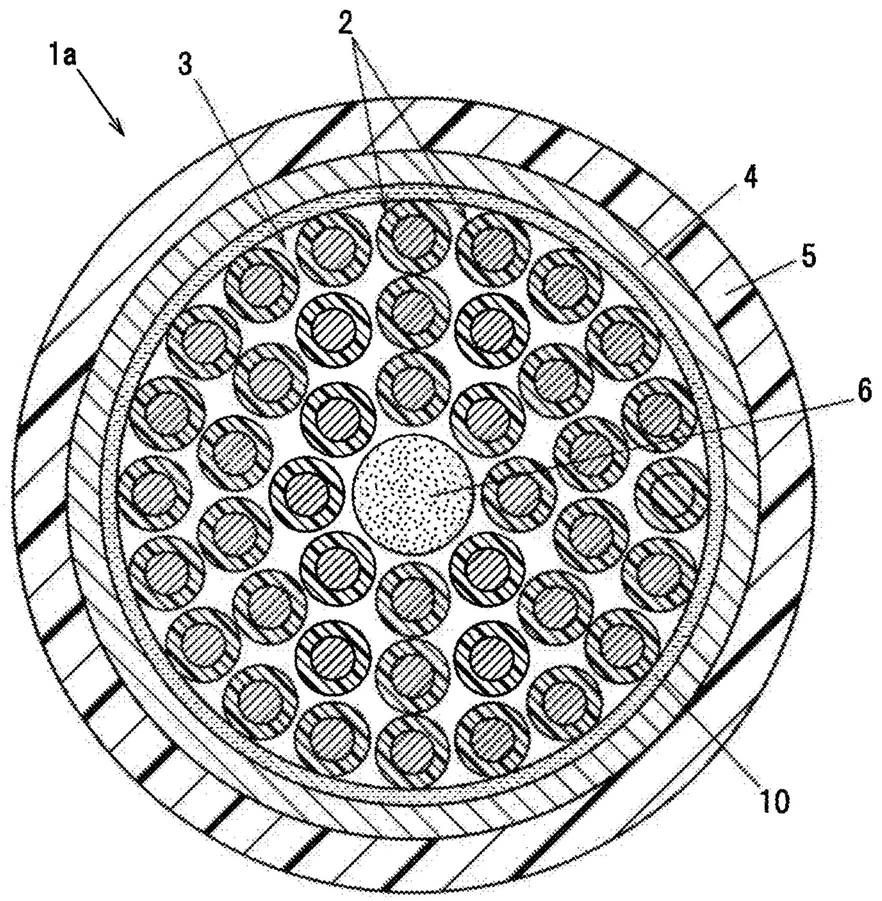
FIG. 2 is a cross-sectional view showing a cross-section perpendicular to a longitudinal direction showing a cable (electric wires) according to another embodiment of the present invention.

In the cable 1*a* shown in FIG. 2, similarly to the cable 1 shown in FIG. 1, the amount of copper to be used can be reduced, and the occurrence of disconnection in the shield layer 4 due to the external force or its own weight can be suppressed. The cable 1*a* has a configuration in which the filler 6 is provided at a cable center, but the configuration is not limited thereto. For example, it is not necessary to provide the filler 6 at the cable center. The electric wires 2 may be arranged at the cable center.

Further, the electric wires 2 constituting the cable core 3 may include both signal lines for signal transmission and power supply lines for power supply, and the signal lines and the power supply lines are twisted together to form the cable core 3. In FIG. 2, the number of electric wires 2 constituting the cable core 3 is forty-two (42), but the number is not limited thereto. The number of electric wires 2 constituting the cable core 3 may be one or more. For example, in the case of a configuration in which one electric wire 2 is arranged at the cable center, a coaxial cable including a shield layer 4 and a sheath 5 sequentially provided around the one electric wire 2 is provided.

(Summary of the Embodiments)

Next, the technical ideas grasped from the embodiments will be described with the aid of the reference characters and the like in the embodiments. It should be noted, however, that each of the reference characters and the like in the following descriptions is not to be construed as limiting the constituent elements in the appended claims to the members and the like specifically shown in the embodiments.

According to the feature [1], a cable 1 includes a cable core 3 including one or more electric wires 2, a shield layer 4 covering around the cable core 3, and a sheath 5 covering around the shield layer 4, wherein the shield layer 4 is composed of a braided shield braided in such a manner that first metal wires 41 composed of aluminum or an aluminum alloy intersect with second metal wires 42 composed of copper or a copper alloy, and wherein an outer diameter of each of the second metal wires 42 is larger than an outer diameter of each of the first metal wires 41.

According to the feature [2], in the cable 1, the cable core 3 includes an inner shield layer 8 covering around the one or more electric wires 2 and being provided inside the shield layer 4, and the inner shield layer 8 is composed of a braided shield braided in such a manner that third metal wires 81 composed of aluminum or an aluminum alloy intersect with fourth metal wires 82 composed of copper or a copper alloy, and wherein an outer diameter of each of the third metal wires 81 is larger than an outer diameter of each of the fourth metal wires 82.

According to the feature [3], in the cable 1 as described in the feature [2], the outer diameter of each of the second metal wires 42 is larger than the outer diameter of each of the fourth metal wires 82, and wherein the outer diameter of each of the first metal wires 41 and the outer diameter of each of the third metal wires 81 are larger than the outer diameter of each of the fourth metal wires 82 and smaller than the outer diameter of each of the second metal wires 42.

According to the feature [4], in the cable 1 as described in the feature [2] or [3], the outer diameter of each of the first metal wires 41 and the outer diameter of each of the third metal wires 81 are equal to each other.

According to the feature [5], in the cable 1 as described in any one of the features [2] to [4], a braided density of the shield layer 4 is 85% or more and a braided density of the inner shield layer 8 is 85% or more.

According to the feature [6], in the cable 1 as described in any one of the features [2] to [5], the one or more electric wire 2 are composed of plural electric wires 2 that are arranged between the inner shield layer 8 and the shield layer 4.

According to the feature [7], in the cable 1 as described in any one of the features [2] to [6], the cable core 3 includes a signal line 21 for signal transmission as the electric wire 2 and a power supply line 22 for power supply as the electric wire 2.

Although the embodiments of the present invention have been described above, the aforementioned embodiments are not to be construed as limiting the inventions according to the appended claims. Further, it should be noted that not all the combinations of the features described in the embodiments are indispensable to the means for solving the problem of the invention. Further, the present invention can be appropriately modified and implemented without departing from the spirit thereof.

The invention claimed is:

1. A cable comprising:

a cable core including one or more electric wires;

a shield layer covering around the cable core; and a sheath covering around the shield layer, wherein the shield layer comprises a braided shield braided in such a manner that first metal wires composed of aluminum or an aluminum alloy intersect with second metal wires composed of copper or a copper alloy, and wherein an outer diameter of each of the second metal wires is larger than an outer diameter of each of the first metal wires, wherein the cable core includes an inner shield layer covering around the one or more electric wires and being provided inside the shield layer, and the inner shield layer comprises a braided shield braided in such a manner that third metal wires composed of aluminum or an aluminum alloy intersect with fourth metal wires composed of copper or a copper alloy, and wherein an outer diameter of each of the third metal wires is larger than an outer diameter of each of the fourth metal wires, wherein the outer diameter of each of the second metal wires is larger than the outer diameter of each of the fourth metal wires, and wherein the outer diameter of each of the first metal wires and the outer diameter of each of the third metal wires are larger than the outer diameter of each of the fourth metal wires but smaller than the outer diameter of each of the second metal wires.

2. The cable according to claim 1, wherein a braided density of the shield layer is 85% or more and a braided density of the inner shield layer is 85% or more.

3. The cable according to claim 1, wherein the one or more electric wires comprises plural electric wires that are arranged between the inner shield layer and the shield layer.

4. The cable according to claim 1, wherein the cable core includes a signal line for signal transmission and a power supply line for power supply as the one or more electric wires.

5. A cable comprising:

a cable core including one or more electric wires;

a shield layer covering around the cable core; and a sheath covering around the shield layer, wherein the shield layer comprises a braided shield braided in such a manner that first metal wires composed of aluminum or an aluminum alloy intersect with second metal wires composed of copper or a copper alloy, and wherein an outer diameter of each of the second metal wires is larger than an outer diameter of each of the first metal wires, wherein the cable core includes an inner shield layer covering around the one or more electric wires and being provided inside the shield layer, and the inner shield layer comprises a braided shield braided in such a manner that third metal wires composed of aluminum or an aluminum alloy intersect with fourth metal wires composed of copper or a copper alloy, and wherein an outer diameter of each of the third metal wires is larger than an outer diameter of each of the fourth metal wires, and wherein the outer diameter of each of the first metal wires and the outer diameter of each of the third metal wires are equal to each other.

* * * * *